(12) United States Patent
Braun

(10) Patent No.: US 9,893,518 B2
(45) Date of Patent: Feb. 13, 2018

(54) ESD PROTECTION CIRCUIT WITH FALSE TRIGGERING PREVENTION

(71) Applicant: Monolithic Power Systems, Inc., San Jose, CA (US)

(72) Inventor: Eric Braun, Mountain View, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 168 days.

(21) Appl. No.: 14/971,920

(22) Filed: Dec. 16, 2015

(65) Prior Publication Data

US 2017/0179714 A1  Jun. 22, 2017

(51) Int. Cl.
*H02H 9/04* (2006.01)

(52) U.S. Cl.
CPC ................. *H02H 9/046* (2013.01)

(58) Field of Classification Search
CPC ................. H02H 9/04; H02H 9/041
USPC .......................................... 361/56
See application file for complete search history.

(56) References Cited

U.S. PATENT DOCUMENTS

| 5,237,395 A | 8/1993 | Lee |
| 5,559,659 A | 9/1996 | Strauss |
| 5,625,522 A | 4/1997 | Watt |
| 5,784,242 A | 7/1998 | Watt |
| 6,008,970 A | 12/1999 | Maloney et al. |
| 6,552,886 B1 | 4/2003 | Wu et al. |
| 6,556,409 B1 * | 4/2003 | Chittipeddi ............. H01L 23/60 361/111 |
| 8,922,963 B2 | 11/2014 | Braun |
| 2013/0016445 A1 * | 1/2013 | Liu ........................ H02H 9/046 361/56 |
| 2014/0198415 A1 * | 7/2014 | Schulmeyer ........... H02H 9/046 361/56 |

* cited by examiner

*Primary Examiner* — Dharti Patel
(74) *Attorney, Agent, or Firm* — Perkins Coie LLP

(57) ABSTRACT

An ESD protection circuit used to protect a protected circuit coupled between a first node and a second node against an ESD event. The ESD protection circuit has a discharging circuit and a control circuit. The discharging circuit selectively provides a current path for discharging a current from the first node to the second node. The control circuit controls the discharging circuit to switch on the current path during an ESD event. The control circuit further controls the discharging circuit to switch off the current path during the normal operation of the protected circuit.

16 Claims, 3 Drawing Sheets

ESD PROTECTION CIRCUIT WITH FALSE TRIGGERING PREVENTION

FIELD OF THE INVENTION

The present invention relates generally to electronic circuits, and more particularly but not exclusively to ESD (electrostatic discharge) protection of electronic circuits.

BACKGROUND OF THE INVENTION

Integrated circuits (ICs) may be damaged from electrostatic discharge (ESD) when a source of electrostatic potential (e.g., human body) comes to contact with the integrated circuits, as an ESD spike may show up, with a voltage reaching up to several thousand volts within a very short time period, typically within 10-100 ns. Conventional ESD protection circuits are often placed between a first node and a second node for protecting an integrated circuit (referred to as a protected circuit hereinafter) coupled between the first node and the second node against an ESD event. However, the conventional ESD protection circuits fail to differentiate a normal operation event of the protected circuit from an ESD event in some occasions, and consequently, the ESD protection circuit is falsely triggered to provide a current path between the first node and the second node to discharge current. For example, when the protected circuit is coupled between an input/output (I/O) pad and a ground pad, a normal fast switching operation occurring at the I/O pad, such as a "hot swap" event, may be falsely detected as an ESD event due to the likewise characteristic of having a fast-rising voltage pulse.

Thus, an ESD protection circuit that is capable of preventing false triggering is desired.

SUMMARY

Embodiments of the present invention are directed to a novel ESD protection circuit with false triggering prevention. The ESD protection circuit is used to protect a protected circuit coupled between a first node and a second node. The ESD protection circuit has a discharging circuit and a control circuit. The discharging circuit selectively provides a current path for discharging a current from the first node to the second node. The control circuit controls the discharging circuit to switch on the current path during an ESD event. The control circuit further controls the discharging circuit to switch off the current path during the normal operation of the protected circuit. The control circuit has a disable circuit and a triggering circuit. The disable circuit has an output terminal and generates a disable signal at the output terminal based on the state of the protected circuit. The triggering circuit is coupled to the disable circuit and generates a triggering signal based on the disable signal. The triggering signal is provided to control the discharging circuit. The triggering signal is in a de-active state to control the discharging circuit to switch off the current path when the disable signal indicates that the protected circuit is in the state of normal operation.

DESCRIPTION OF THE DRAWINGS

The present invention can be further understood with reference to the following detailed description and the appended drawings, wherein like elements are provided with like reference numerals.

DESCRIPTION

Figure 1:
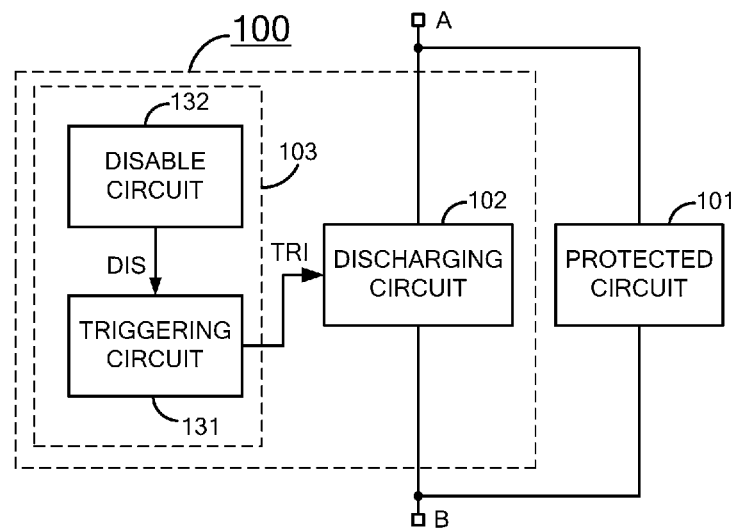
FIG. 1 illustrates an ESD protection circuit 100 for protecting a protected circuit 101 in accordance with an embodiment of the present invention.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

FIG. 1 illustrates an ESD protection circuit 100 for protecting a protected circuit 101 in accordance with an embodiment of the present invention. Referring to FIG. 1, the protected circuit 101 is coupled between node A and node B. The protected circuit 101 may be also referred to by those skilled in the art as a core circuit, an internal circuit, an integrated circuit or some other suitable terminology. The term "coupled" herein and throughout the present invention may refer to "directly connected" or "indirectly connected", depending on the specific situation. In a preferred embodiment, node A may be an input/output (I/O) pad while node B may be a ground pad. However, it should be noted that this is not intended to limit the scope of the invention, in another embodiment, node A and node B may be any combination of suitable pad types, such as I/O pad, supply voltage pad, ground pad or the like, where an ESD event may occur.

Further referring to FIG. 1, the ESD protection circuit 100 is illustrated to comprise a discharging circuit 102 and a control circuit 103. The discharging circuit 102 is coupled between node A and node B to selectively provide a current path for discharging a current from node A to node B to protect the protected circuit 101 against an ESD event.

The control circuit 103 is configured to detect the ESD event and the state of the protected circuit whether it is in normal operation or not, and to thus control the discharging circuit 102 in response to the detecting result. During the ESD event, the control circuit 103 controls the discharging circuit 102 to switch on the current path for releasing the ESD energy. During the normal operation of the protected circuit 101, the control circuit 103 operates to control the discharging circuit 102 such that the current path is switched off. Herein and throughout the present disclosure, when a current path is "switched on", it means that the current path is established, thus allowing a current to flow through, while when a current path is "switched off", it means that the current path is cut off and no current can thus flow through the current path.

As a result, the ESD protection circuit 100 is able to protect the protected circuit 101 against ESD events. And in addition, current is prevented from discharging through the discharging circuit 102 during the normal operation of the protected circuit 101 and false triggering is thus prevented when a normal operation of the protected circuit 101 which may be regarded as an ESD event is performed.

In the embodiment illustrated in FIG. 1, the control circuit 103 is illustrated to comprise a triggering circuit 131 and a disable circuit 132. The disable circuit 132 comprises an output terminal and is configured to generate a disable signal DIS at the output terminal based on the state of the protected circuit 101. The state of the protected circuit 101 refers to the state whether the protected circuit 101 is in normal operation or not. The triggering circuit 131 is coupled to the disable circuit 132 to receive the disable signal DIS and is configured to generate a triggering signal TRI to control the discharging circuit 102 in response to the disable signal DIS. The triggering signal TRI is in a de-active state to switch off the discharging circuit 102 when the disable signal DIS indicates that the protected circuit 101 is in normal operation. In one embodiment, the disable circuit 132 is configured to generate the disable signal DIS further based on the detection of an ESD event. In such embodiment, the triggering signal TRI is further in an active state to switch on the discharging circuit 102 when the disable signal DIS indicates that an ESD event occurs. Herein and throughout the present disclosure, when the discharging circuit is "switched on"/"switched off", it means that the current path provided by the discharging circuit is "switched on"/"switched off".

Figure 2:
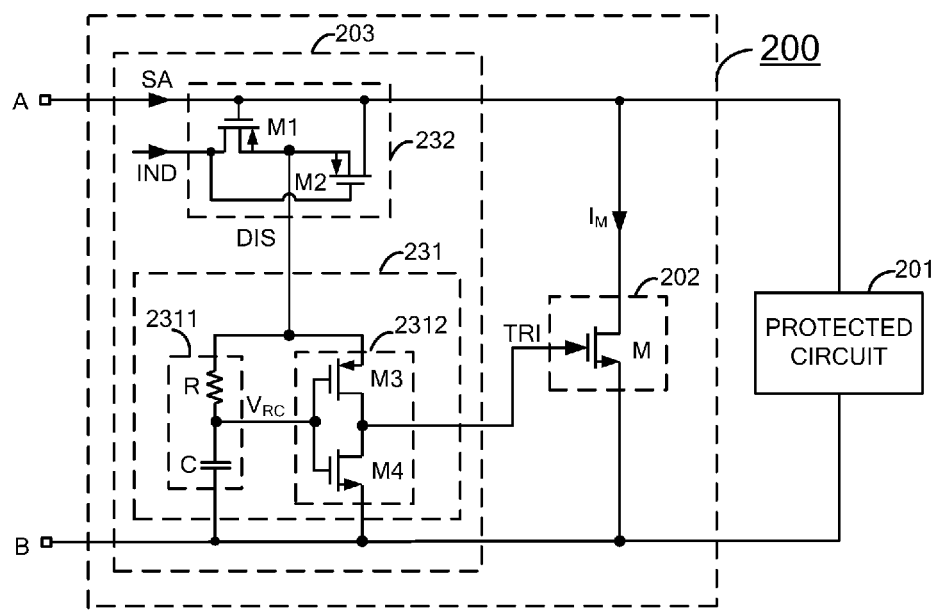
FIG. 2 illustrates an ESD protection circuit 200 for protecting a protected circuit 201 in accordance with another embodiment of the present invention.

FIG. 2 illustrates an ESD protection circuit 200 for protecting a protected circuit 201 in accordance with another embodiment of the present invention. The protected circuit 201 is coupled between node A and node B and has a similar configuration as that of the protected circuit 101 shown in FIG. 1 and is thus not described herein again for clarity purpose.

As illustrated in FIG. 2, the ESD protection circuit 200 comprises a discharging circuit 202 and a control circuit 203. The discharging circuit 202 is illustrated to comprise an N-type Metal-Oxide-Semiconductor Field Effect Transistor (MOSFET) M having a first terminal, a second terminal and a control terminal. In one embodiment, the first terminal and the second terminal of the MOSFET M respectively comprise a drain terminal and a source terminal. The first terminal of the MOSFET M is coupled to node A, preferably an I/O pad in the embodiment of FIG. 2, while the second terminal is coupled to node B, preferably a ground pad. Persons of ordinary skill in the art will recognize that the N-type MOSFET illustrated in FIG. 2 is not intended to be taken in a limited sense, in another embodiment, the discharging circuit 202 may comprise any suitable switch which may be controlled to be turned on and off, e.g., a bipolar transistor, or a driver Metal-Oxide-Semiconductor Field Effect Transistor (DrMOS), etc. It should be also noted that, in another embodiment as later illustrated in FIG. 5, the discharging circuit 202 may comprise a P-type device.

The control circuit 203 is illustrated to comprise a triggering circuit 231 and a disable circuit 232. The disable circuit 232 is illustrated to comprise a first input terminal coupled to node A, a second input terminal and an output terminal. At the first input terminal, the disable circuit 232 is configured to receive a signal SA showing up at node A. The signal SA may be an operating signal during the normal operation of the protected circuit 201, such as an input signal provided to or an output signal generated by the protected circuit 201, or a power supply signal provided to supply an operating voltage to the internal components of the protected circuit 201. The signal SA may be an ESD signal comprising one or more ESD pulses during an ESD event. At the second input terminal, the disable circuit 232 is configured to receive an indication signal IND indicating the state of the protected circuit 201. The state of the protected circuit 201 indicates whether the protected circuit 201 is in normal operation or not. The disable circuit 232 is configured to compare the signal SA at node A with the indication signal IND. And based on the comparison result, the disable circuit 232 is further configured to output either the signal SA or the indication signal IND at the output terminal, as a disable signal DIS. In one embodiment where a high level state of the indication signal IND indicates that the protected circuit 201 is in normal operation, the disable circuit 232 outputs either the signal SA at node A or the indication signal IND at the output terminal, based on which of the signal SA and the indication signal IND has a higher voltage value. That is, the disable circuit 232 outputs either the signal SA at node A when the signal SA has a higher voltage value than the indication signal IND does or the indication signal IND when the indication signal IND has a higher voltage value than the signal SA does. In one embodiment, the second input terminal of the disable circuit 232 may be coupled to a supply voltage signal supplied to drive the internal components of the protected circuit 201, with a typical value of 5 volts, during the normal operation of the protected circuit 201. In another embodiment, the second input terminal of the disable circuit 232 may be floated or grounded when the protected circuit 201 is not in normal operation.

As shown in FIG. 2, the disable circuit 232 is illustrated to comprise a first P-type MOSFET M1 and a second P-type MOSFET M2. The MOSFET M1 comprises a first terminal (e.g., a drain terminal), a second terminal (e.g., a source terminal) and a control terminal, wherein the first terminal is coupled to the second input terminal of the disable circuit 232 and the control terminal is coupled to node A. The MOSFET M1 is configured to receive the indication signal IND at the first terminal and to receive the signal SA at node A at the control terminal. The MOSFET M2 comprises a first terminal (e.g., a drain terminal), a second terminal (e.g., a source terminal) and a control terminal, wherein the first terminal of the MOSFET M2 is coupled to node A, the second terminal of the MOSFET M2 is coupled to the second terminal of the MOSFET M1 and is configured as the output terminal of the disable circuit 232, and the control terminal of the MOSFET M2 is coupled to the first terminal of the MOSFET M1. The MOSFET M2 is configured to receive the indication signal IND and the signal SA respectively at the control terminal and the first terminal and to further provide the disable signal DIS at the second terminal. When the indication signal IND is higher than the signal SA at node A, e.g., IND=5V, SA=0V, the MOSFET M1 is turned on as the gate-source voltage is lower than the negative threshold voltage of the MOSFET M1 and the MOSFET M2 is turned off as the gate-source voltage is higher than the negative threshold voltage of the MOSFET M2. As a result, the indication signal IND is provided as the disable signal DIS. In other words, the disable signal DIS is equal to the indication signal IND. On the contrary, when the indication signal IND is smaller than the signal SA at node A, e.g., IND=0V, SA=3V, the MOSFET M1 is turned off as the gate-source voltage is higher than the negative threshold voltage of the MOSFET M1 and the MOSFET M2 is turned on as the gate-source voltage is lower than the negative threshold voltage of the MOSFET M2. As a result, the disable signal DIS is equal to the signal SA at node A. As can be seen from the above analysis, the disable circuit 232 comprising the MOSFETs M1 and M2 outputs either the indication signal IND or the signal SA at node A based on which of these two signals has a higher voltage value.

It should be noted that the MOSFETs M1 and M2 are for illustrative purpose and should not be taken in a limited sense, in another embodiment, the MOSFETs M1 and M2 may be replaced by other suitable components, such as BJT, IGBT or the like. And in further another embodiment, the P-type MOSFETs may be replaced by N-type MOSFETs.

The triggering circuit 231 is illustrated to comprise a timer 2311 and a buffer 2312. The timer 2311 is coupled between the output terminal of the disable circuit 232 and node B, and is configured to set a time threshold for turning on the discharging circuit as well as an ESD discharging time period. The buffer 2312 is coupled between the output terminal of the disable circuit 232 and node B, and is configured to drive the MOSFET M of the discharging circuit 202.

In the embodiment of FIG. 2, the timer 2311 is illustrated to comprise a resistor R and a capacitor C. The resistor R has a first terminal and a second terminal, wherein the first terminal is coupled to the output terminal of the disable circuit 232. The capacitor C has a first terminal and a second terminal, wherein the first terminal of the capacitor C is coupled to the second terminal of the resistor R, and the second terminal of the capacitor C is coupled to node B. The second terminal of the resistor R and the first terminal of the capacitor C are configured together as an output terminal of the timer 2311, and the timer 2311 is configured to provide a timing signal $V_{RC}$ at the output terminal.

The buffer 2312 is illustrated to comprise a P-type MOSFET M3 and an N-type MOSFET M4. The MOSFET M3 has a first terminal (e.g., a source terminal) coupled to the output terminal of the disable circuit 232, a second terminal (e.g., a drain terminal) and a control terminal coupled to the output terminal of the timer 2311, wherein the MOSFET M3 is configured to receive the timing signal $V_{RC}$ at the control terminal. The MOSFET M4 has a first terminal (e.g., a drain terminal), a second terminal (e.g., a source terminal) and a control terminal, wherein the first terminal of the MOSFET M4 is coupled to the second terminal of the MOSFET M3, the second terminal of the MOSFET M4 is coupled to node B, and the control terminal of the MOSFET M4 is coupled to the output terminal of the timer 2311 as well as the control terminal of the MOSFET M3. The second terminal of the MOSFET M3 and the first terminal of the MOSFET M4 are configured together as an output terminal of the buffer 2312, and the buffer 2312 is configured to output a triggering signal TRI at the output terminal to switch the current path provided by the discharging circuit 202 on and off.

Figure 3:
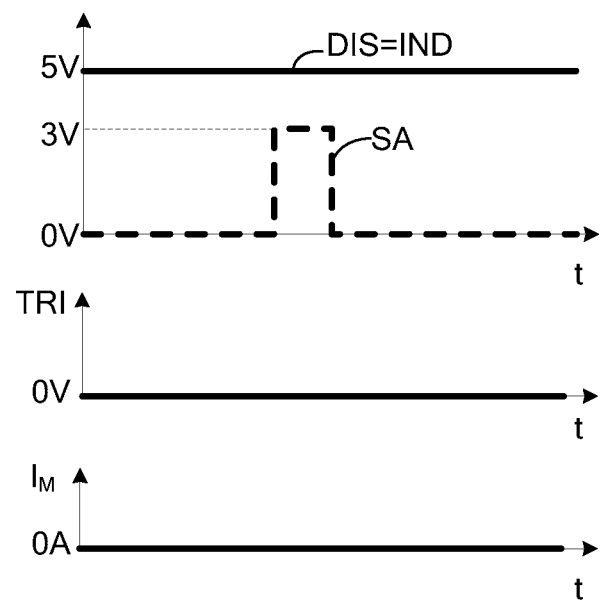
FIG. 3 illustrates waveforms of the ESD protection circuit 200 shown in FIG. 2 during the normal operation of the protected circuit 201.
Figure 4:
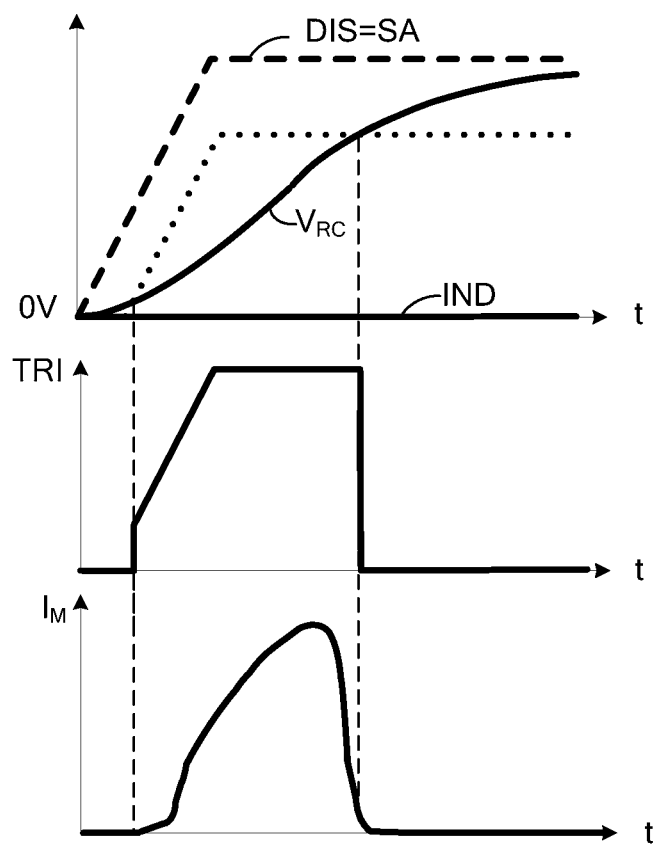
FIG. 4 illustrates waveforms of the ESD protection circuit 200 shown in FIG. 2 when an ESD event occurs.

FIG. 3 illustrates waveforms of the ESD protection circuit 200 shown in FIG. 2 during the normal operation of the protected circuit 201. FIG. 4 illustrates waveforms of the ESD protection circuit 200 shown in FIG. 2 when an ESD event occurs. The waveforms shown in FIG. 3 and FIG. 4 illustrate the indication signal IND, the signal SA at node A, the triggering signal TRI and the current $I_M$ flowing through the discharging circuit 202.

The operation of the ESD protection circuit 200 will be explained below with references to FIG. 2~FIG. 4. As shown in FIG. 3, during the normal operation of the protected circuit 201, the indication signal IND remains in a high-voltage state HI (typically, 5 volts). A pulse with a typical value of 3 or 4 volts shows up at node A as the signal SA when a normal operation event, e.g., a "hot swap" event, of the protected circuit 201 is performed. Consequently, the disable circuit 232 outputs the indication signal IND as the disable signal DIS as the indication signal IND has a higher voltage value than the signal SA does, i.e., DIS=IND. The timing signal $V_{RC}$ tracks the disable signal DIS and is thus substantially equal to the indication signal IND, which in turn turns the MOSFET M4 on and the MOSFET M3 off, thus grounding the control terminal of the MOSFET M. In other words, the triggering signal TRI is in a de-active state (0 volt), which switches off the current path provided by the discharging MOSFET M and allows no current to flow from node A to node B, that is, the current $I_M$ flowing through the discharging MOSFET M is equal to 0 Ampere ($I_M$=0 A). As can be seen from the above analysis, even if a pulse due to a normal operation event shows up during the normal operation of the protected circuit 201, as the pulse is overridden by the indication signal IND, the discharging circuit 202 remains off to prevent the ESD protection circuit 201 from being falsely triggered by the normal operation of the protected circuit 201.

On the other hand, as shown in FIG. 4, when the protected circuit 201 is not in normal operation, the indication signal IND remains in a low-voltage state LO (typically, 0 volt) and the disable circuit 232 thus outputs the signal SA as the disable signal DIS when a fast-rising ESD pulse shows up at node A during an ESD event, i.e., DIS=SA. The voltage of the timing signal $V_{RC}$ is initially zero and then increases gradually to track the ESD pulse. The MOSFET M3 is turned on and the MOSFET M4 is turned off when the timing signal $V_{RC}$ is smaller than the sum of the voltage of the ESD pulse and the negative threshold voltage of the MOSFET M3 (the sum is denoted by the dot line in FIG. 4), which allows the triggering signal TRI to follow the ESD pulse to switch on the discharging circuit 202. As a result, a current $I_M$ flows from node A to node B to discharge the ESD energy.

Figure 5:
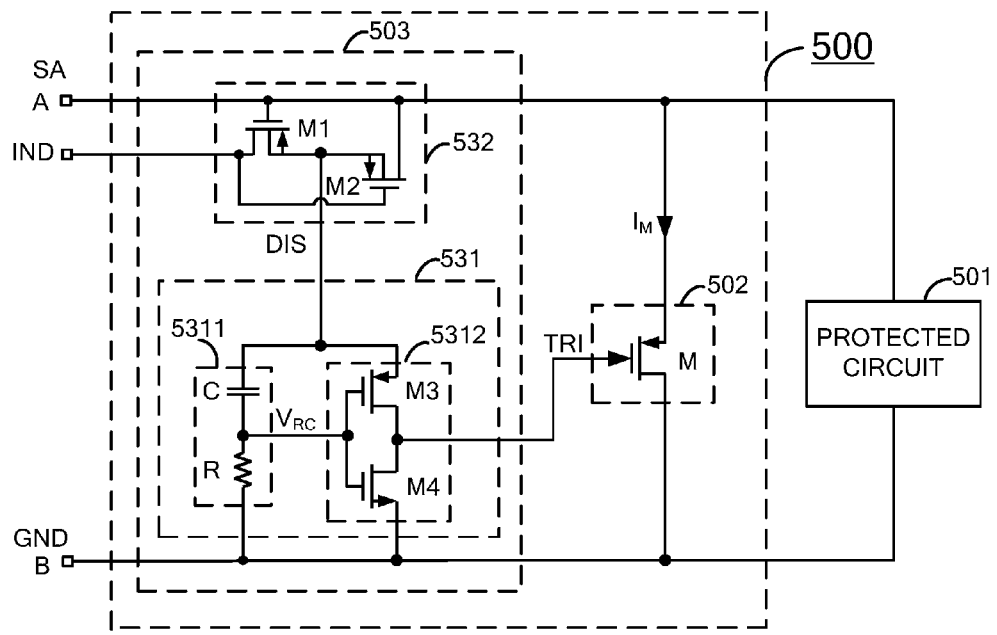
FIG. 5 illustrates an ESD protection circuit 500 with the discharging circuit 502 comprising a P-type device in accordance with another embodiment of the present invention.

As mentioned above, in some embodiments, the discharging circuit 202 of FIG. 2 may comprise a P-type power device instead of the N-type device as shown in FIG. 2. FIG. 5 illustrates an ESD protection circuit 500 with the discharging circuit 502 comprising a P-type device in accordance with another embodiment of the present invention. The ESD protection circuit 500 has a similar configuration as that of the ESD protection circuit 200, the same parts are not described herein again for clarity purpose and only the different parts are emphasized. Referring to FIG. 5, the discharging circuit 502 comprises a P-type MOSFET M having a first terminal (e.g., a source terminal), a second terminal (e.g., a drain terminal) and a control terminal. The first terminal of the MOSFET M is coupled to node A, while the second terminal is coupled to node B. The timer 5311 comprises a resistor R and a capacitor C. The resistor R has a first terminal and a second terminal, wherein the first terminal is coupled to node B. The capacitor C has a first terminal and a second terminal, wherein the first terminal of the capacitor C is coupled to the second terminal of the resistor R, and the second terminal of the capacitor C is coupled to the output terminal of the disable circuit 532. The second terminal of the resistor R and the first terminal of the capacitor C are configured together as an output terminal of the timer 5311, and a timing signal $V_{RC}$ is provided at the output terminal. The buffer 5312 generates a triggering signal TRI based on the timing signal $V_{RC}$ to control the P-type MOSFET M so that the P-type MOSFET M is turned on during an ESD event and turned off during the normal operation of the protected circuit 501.

Figure 6:
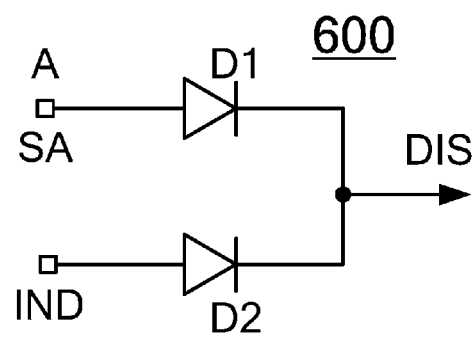
FIG. 6 schematically illustrates a disable circuit 600 in accordance with another embodiment of the present invention.

FIG. 6 schematically illustrates a disable circuit 600 in accordance with another embodiment of the present invention. As shown in FIG. 6, the disable circuit 600 is illustrated to comprise a first diode D1 and a second diode D2. The first diode D1 has an anode coupled to node A and a cathode, wherein the first diode D1 is configured to receive the signal SA at the anode. The second diode D2 has an anode and a cathode, and the cathode of the second diode D2 is coupled to the cathode of the first diode D1 and is configured as an output terminal of the disable circuit 600. The second diode D2 is configured to receive the indication signal IND at the anode and to output the disable signal DIS at the cathode. When the voltage of the signal SA is higher than the voltage of the indication signal IND, the first diode D1 is on and the second diode D2 is off, which in turn makes the disable signal DIS equal to the signal SA. On the contrary, the first diode D1 is off and the second diode D2 is on when the voltage of the indication signal IND is higher than the voltage of the signal SA, which in turn makes the disable signal DIS equal to the indication signal IND. As can be seen from the above analysis, the disable circuit 600 outputs either the signal SA at node A or the indication signal IND depending on which of these two signals has a higher voltage value.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. An ESD protection circuit for protecting a protected circuit coupled between a first node and a second node, the ESD protection circuit comprising:
  a discharging circuit configured to selectively provide a current path for discharging a current from the first node to the second node; and
  a control circuit configured to control the discharging circuit to switch on the current path during an ESD event, and to control the discharging circuit to switch off the current path during the normal operation of the protected circuit, wherein the control circuit comprises:
    a disable circuit having a first input terminal, a second input terminal and an output terminal, wherein the first input terminal is coupled to the first node, and wherein the disable circuit is configured to receive a signal at the first node at the first input terminal and an indication signal indicating the state of the protected circuit at the second input terminal and the disable circuit is further configured to compare the signal at the first node with the indication signal, and to output either the signal at the first node or the indication signal as a disable signal at the output terminal based on the comparison result; and
    a triggering circuit coupled to the disable circuit and configured to generate a triggering signal based on the disable signal, wherein the triggering signal is provided to control the discharging circuit, and wherein the triggering signal is in a de-active state to control the discharging circuit to switch off the current path when the disable signal indicates that the protected circuit is in the state of normal operation.

2. The ESD protection circuit of claim 1, wherein the disable circuit is configured to generate the disable signal further based on the detection of the ESD event, and the triggering signal is in an active state to control the discharging circuit to switch on the current path when the disable signal indicates that the ESD event occurs.

3. The ESD protection circuit of claim 1, wherein the disable circuit is configured to output either the signal at the first node or the indication signal as the disable signal based on which of the signal at the first node and the indication signal has a higher voltage value.

4. The ESD protection circuit of claim 3, wherein when the protected circuit is not in normal operation, the indication signal is in a low-voltage state so that the disable circuit outputs the signal at the first node as the disable signal, and when the protected circuit is in normal operation, the indication signal is in a high-voltage state so that the disable circuit outputs the indication signal as the disable signal.

5. The ESD protection circuit of claim 3, wherein the second input terminal of the disable circuit is coupled to a supply voltage signal for supplying an operating voltage to the protected circuit when the protected circuit is in normal operation and is floated or grounded when the protected circuit is not in normal operation.

6. The ESD protection circuit of claim 1, wherein the disable circuit comprises:
  a first transistor having a first terminal, a second terminal and a control terminal coupled to the first node, wherein the first transistor is configured to receive an indication signal indicating the state of the protected circuit at the first terminal, and to receive the signal at the first node at the control terminal; and
  a second transistor having a first terminal coupled to the first node, a second terminal coupled to the second terminal of the first transistor and a control terminal coupled to the first terminal of the first transistor, wherein the second transistor is configured to receive the signal at the first node at the first terminal, and to further provide the disable signal at the second terminal.

7. The ESD protection circuit of claim 6, wherein the first transistor and the second transistor are P-type MOSFETs.

8. The ESD protection circuit of claim 1, wherein the disable circuit comprises:
  a first diode having an anode coupled to the first node and a cathode, wherein the first diode is configured to receive the signal at the first node at the anode; and
  a second diode having a cathode coupled to the cathode of the first diode and an anode, wherein the second diode is configured to receive an indication signal indicating the state of the protected circuit at the anode, and to further provide the disable signal at the cathode.

9. The ESD protection circuit of claim 1, wherein the triggering circuit comprises:
  a timer coupled between the output terminal of the disable circuit and the second node, wherein the timer is configured to provide a timing signal to set a time threshold for switching on the discharging circuit and a time period for ESD discharging; and
  a buffer coupled between the output terminal of the disable circuit and the second node, wherein the buffer is further coupled to the output terminal of the timer to receive the timing signal, and wherein based on the timing signal, the buffer is configured to provide the triggering signal.

10. The ESD protection circuit of claim 9, wherein the timer comprises:
   a resistor having a first terminal and a second terminal, wherein the first terminal is coupled to the output terminal of the disable circuit; and
   a capacitor having a first terminal and a second terminal, wherein the first terminal is coupled to the second terminal of the resistor, and the
   second terminal is coupled to the second node; and
   the buffer comprises:
   a PMOS transistor having a first terminal coupled to the output terminal of the disable circuit, a control terminal coupled to the second terminal of the resistor, and a second terminal; and
   an NMOS transistor having a first terminalcoupled to the second node, a second terminal coupled to the second terminal of the PMOS transistor and a control terminal coupled to the second terminal of the resistor, whereinthe triggering signal is provided at the second term inalof the NMOS transistor.

11. The ESD protection circuit of claim 10, wherein the discharging circuit comprises an N-type transistor.

12. The ESD protection circuit of claim 9, wherein the timer comprises:
   a resistor having a first terminal and a second terminal, wherein the first terminal is coupled to the second node; and
   a capacitor having a first terminal and a second terminal, wherein the first terminal is coupled to the second terminal of the resistor, and the second terminal is coupled to the output terminal of the disable circuit; and
   the buffer comprises:
   a PMOS transistor having a first terminal coupled to the output terminal of the disable circuit, a control terminal coupled to the second terminal of the resistor, and a second terminal; and
   an NMOS transistor having a first terminal coupled to the second node, a second terminal coupled to the second terminal of the PMOS transistor, and a control terminal coupled to the second terminal of the resistor, whereinthe triggering signal is provided at the second term inalof the NMOS transistor.

13. The ESD protection circuit of claim 12, wherein the discharging circuit comprises a P-type transistor.

14. The ESD protection circuit of claim 1, wherein the discharging circuit comprises a transistor.

15. The ESD protection circuit of claim 14, wherein the discharging circuit comprises a MOSFET or a BJT.

16. The ESD protection circuit of claim 1, wherein the first node is an I/O pad and the second node is a ground pad.

* * * * *